United States Patent
Miyata et al.

(10) Patent No.: US 8,482,309 B2
(45) Date of Patent: Jul. 9, 2013

(54) FAILURE DETECTING METHOD FOR A SOLAR POWER GENERATION SYSTEM

(75) Inventors: Yukitaka Miyata, Osaka (JP); Jun Ishida, Osaka (JP); Osamu Shizuya, Osaka (JP)

(73) Assignee: Onamba Co., Ltd. (JP)

(*) Notice: Subject to any disclaimer, the term of this patent is extended or adjusted under 35 U.S.C. 154(b) by 411 days.

(21) Appl. No.: 13/054,465

(22) PCT Filed: Feb. 19, 2010

(86) PCT No.: PCT/JP2010/001104
§ 371 (c)(1),
(2), (4) Date: Jan. 14, 2011

(87) PCT Pub. No.: WO2011/101916
PCT Pub. Date: Aug. 25, 2011

(65) Prior Publication Data
US 2012/0268158 A1 Oct. 25, 2012

(51) Int. Cl.
*G01R 31/26* (2006.01)
(52) U.S. Cl.
USPC ...... 324/761.01; 324/555; 324/718; 324/509; 324/750.02; 324/750.01; 136/244; 136/250; 136/252
(58) Field of Classification Search
USPC .............. 324/761.01, 555, 718, 509, 750.02, 324/750.01; 136/244, 250, 252
See application file for complete search history.

(56) References Cited

U.S. PATENT DOCUMENTS

| 4,595,789 | A | * | 6/1986 | Nagase et al. | 136/244 |
|---|---|---|---|---|---|
| 6,392,422 | B1 | * | 5/2002 | Kammer et al. | 324/650 |
| 6,735,946 | B1 | * | 5/2004 | Otting et al. | 60/641.11 |
| 6,886,339 | B2 | * | 5/2005 | Carroll et al. | 60/641.8 |
| 7,051,529 | B2 | * | 5/2006 | Murphy et al. | 60/641.8 |
| 7,299,633 | B2 | * | 11/2007 | Murphy et al. | 60/641.8 |
| 7,928,315 | B2 | * | 4/2011 | Nagai et al. | 136/244 |
| 2002/0195136 | A1 | * | 12/2002 | Takabayashi et al. | 136/244 |
| 2004/0118449 | A1 | * | 6/2004 | Murphy et al. | 136/253 |
| 2004/0211459 | A1 | * | 10/2004 | Suenaga et al. | 136/244 |
| 2004/0231329 | A1 | * | 11/2004 | Carroll et al. | 60/641.8 |
| 2005/0121067 | A1 | * | 6/2005 | Toyomura et al. | 136/244 |
| 2006/0179840 | A1 | * | 8/2006 | Murphy et al. | 60/641.8 |

(Continued)

FOREIGN PATENT DOCUMENTS

| JP | 07-123594 | 5/1995 |
|---|---|---|
| JP | 07-334767 | 12/1995 |

(Continued)

OTHER PUBLICATIONS

Yukari Nakamura, "International Preliminary Report on Patentability" in connection with corresponding International App. No. PCT/JP2010/001104, dated Sep. 27, 2012, 7 pages.

*Primary Examiner* — Jermele M Hollington
*Assistant Examiner* — Lamarr Brown
(74) *Attorney, Agent, or Firm* — Kolisch Hartwell, P.C.

(57) ABSTRACT

A failure detecting method for a solar power generation system having plural solar cell strings in each of which plural solar cell modules are connected to each other in series. Specifically, by comparing the current value of each of the solar cell modules or strings with the average current value per one module or string, calculated from the total current value of the entire solar cell modules or strings, one or more failure candidates can be detected with high precision.

6 Claims, 3 Drawing Sheets

U.S. PATENT DOCUMENTS

| | | |
|---|---|---|
| 2009/0066357 A1 | 3/2009 | Fornage |
| 2010/0071764 A1* | 3/2010 | Kim .............................. 136/256 |
| 2010/0282293 A1* | 11/2010 | Meyer et al. ................. 136/244 |
| 2010/0308662 A1* | 12/2010 | Schatz et al. ..................... 307/80 |
| 2011/0073150 A1* | 3/2011 | Hightower et al. ........... 136/244 |
| 2011/0084551 A1* | 4/2011 | Johnson et al. ................. 307/24 |
| 2011/0288807 A1* | 11/2011 | Iwase et al. ................... 702/117 |
| 2012/0048326 A1* | 3/2012 | Matsuo et al. ................ 136/244 |
| 2012/0199179 A1* | 8/2012 | Nakata ......................... 136/250 |

FOREIGN PATENT DOCUMENTS

| | | |
|---|---|---|
| JP | 09-128070 | 5/1997 |
| JP | 11-175177 | 7/1999 |
| JP | 2000-214938 | 8/2000 |
| JP | 2000-269531 | 9/2000 |
| JP | 2001-326375 | 11/2001 |
| JP | 2005-340464 | 12/2005 |
| JP | 2006-310780 | 11/2006 |

* cited by examiner

FAILURE DETECTING METHOD FOR A SOLAR POWER GENERATION SYSTEM

TECHNICAL FIELD

The present invention relates to a method for precisely detecting a failure of a solar power generation system without being affected by any temporary external factor when a power generation quantity (current value) measured in each of solar cell modules or solar cell strings is lowered.

BACKGROUND ART

In order to use solar energy effectively, solar power generation systems have been spreading wherein a large number of solar cell panels are arranged. About the solar power generation systems, various systems exist which range from small-scale systems each set on a house roof to large-scale systems each having a power generation quantity of 1 megawatt or more that can supply the regional electricity.

As illustrated in, for example, FIG. 1, in a large-scale system, plural solar cell modules 1 are connected to each other in series so as to constitute each solar cell string 2 and, if necessary, to an electric power end thereof is connected a diode 4 for backflow prevention. Both ends of the solar cell string 2 are connected to electric power cables 3 in order to collect electric power. The solar cell strings 2, which each have such a structure, exist in a large number. Electric powers generated in the individual strings are collected through the electric power cables 3, so as to be sent to a single collected-power terminal device. The collected power is to be an output of the solar power generation system.

In any solar power generation system, the power generation quantity of its solar cell modules or solar cell strings may lower due to an error in a work for setting up the system, a defect of parts thereof, a deterioration with age based on use over many years, a failure caused by thunder or the like, or an external factor such as weather, a maintenance thereof or a shadow. When the lowering of the power generation quantity is caused by any temporary external factor, the lowering may be ignored. However, when it is caused by a failure, it is desired to repair or exchange the corresponding module(s) or string(s) as soon as possible.

However, in a power generation system composed of many solar cell modules or solar cell strings, considerable time and labor are required for finding out only the module or string having failure by excluding the influence of external factor. It is difficult to know the existence of a failure itself, in particular, in a mega solar system as illustrated in FIG. 2, wherein one thousand or more strings or several thousands or more of modules are arranged in a site wider than an area several hundreds of meters square to give a power generation quantity of 1 megawatt or more. It is more difficult to locate the position of the failure.

A conventional detection of an abnormality of a solar power generation system is generally attained by taking each solar cell module which constitutes a solar cell panel as a unit, or by taking each solar cell string which is composed of plural solar cell modules as a unit.

For example, Patent Document 1 suggests solar cell modules each having detecting means for detecting an electric current or voltage by taking each solar cell module as a unit, and communicating means for making a communication in accordance with outputs from the plural detecting means. The aim of the above solar cell modules is to remove a necessity that a failure should be checked near each of the modules by a checking worker. However, only an abnormality of an electric parameter value can be detected. Thus, it is difficult to extract precisely only the solar cell module having failure by excluding the influence of external factor such as weather.

Patent Document 2 suggests an abnormality-detecting device for a solar cell wherein it is decided whether or not an abnormality is generated in the solar cell by making a comparison between a calculated power generation quantity data of the solar cell over a given period and a power generation quantity data which was measured in a situation corresponding to the situation that the above calculated power generation quantity data was measured and which has been already memorized in memorizing means. This device is a device wherein a comparison is made between power generation quantity data measured at times similar to each other in weather, so as to make a decision, thereby decreasing the influence of changes in the situation of the surroundings, such as a weather-dependent change in solar radiation quantity. However, it is difficult to appropriately extract, from power generation quantity data in the past, a similar comparative data. Additionally, there remains a problem that the precision of the decision becomes very low when an unpredicted change in weather is caused over a day. Furthermore, it is a very troublesome work to memorize power generation quantity data in the past and process the data so as to be usable, as data for comparison, in accordance with weather or seasons. As a result, a problem that the work makes the system complicated is caused.

Patent Document 3 suggests a solar power generation system wherein when a change has been made in a quantity more than a predetermined quantity between past power generation data and the present power generation data, a statement that the change has been made is displayed. This system also compares the present power generation data with power generation data in the past, and has the same problems as in Patent Document 2.

PRIOR ART DOCUMENTS

Patent Documents

1. Japanese Patent Application Laid-Open (JP-A) No. 2000-269531
2. Japanese Patent Application Laid-Open (JP-A) No. 123594/95
3. Japanese Patent Application Laid-Open (JP-A) No. 2006-310780

DISCLOSURE OF THE INVENTION

Problems to be Solved by the Invention

The present invention has been made in light of the problems in the conventional art, and an object thereof is to provide a method for detecting, with a high precision, the failure of a solar cell module or string of a solar power generation system in a simple way without receiving the influence of any temporary external factor substantially, and an apparatus therefor.

Means to Solve the Problems

In order to attain the object, the present inventors have first paid attention to a matter that when a solar cell module or string is in a failure state, the current value (power generation quantity) thereof is lower than the current value of a large number of other solar cell modules or strings, which generate power normally and which are exposed under the same conditions as the solar cell module or string having failure, by a predetermined percentage or more; a matter that even when the failure of a solar cell module or string exist, it is only a minority of all the modules or strings and the majority thereof work normally; and a matter that seen over long time, a large difference is not generated in degree between influences of external factor, such as weather, onto the current values of the solar cell modules or strings, for any modules or strings. Based on the findings, the present inventors have found out that, by comparing the current value of each of the solar cell modules or strings with the average current value per one module or string, calculated from the total current value of the entire solar cell modules or strings, the influence of external factor, such as weather, is substantially cancelled so that one or more failure candidates can be easily detected with a high precision. As a result, the present invention has been made.

Thus, the present invention adopts the following subject matters (1) to (6):

(1) A failure detecting method for a solar power generation system having plural solar cell strings in each of which plural solar cell modules are connected to each other in series, wherein: made is a measurement of the current value of each of the solar cell modules or the current value of each of the solar cell strings and the total current value of the whole of the solar power generation system; the measured current value of each of the solar cell modules or the measured current value of each of the solar cell strings is compared with an average current value per one solar cell module or an average current value per one solar cell string that are calculated out from the measured total current value of the whole of the solar power generation system; when the measured current value(s) of one or more of the solar cell modules or the measured current value(s) of one or more of the solar cell strings is/are (each) lower than the calculated average current value per one solar cell module or the calculated average current value per one solar cell string by a predetermined percentage or more, the solar cell module(s) or the solar cell string(s) in the low current value state is/are extracted as failure candidate(s); and then the extracted module(s) or string(s) is/are displayed or notified.

(2) The failure detecting method for the solar power generation system according to item (1), wherein the measurement and the comparison of the current values are continuously or intermittently made.

(3) The failure detecting method for the solar power generation system according to item (1) or (2), wherein out of the solar cell modules or the solar cell strings, one or more solar cell module(s) or solar cell string(s) wherein the low current value state is detected even after a predetermined period elapses are extracted as the failure candidate(s).

(4) The failure detecting method for the solar power generation system according to any one of items (1) to (3), wherein the solar cell module(s) or the solar cell string(s) having the percentage of the lowering in the current value of 30% or more is/are extracted as the failure candidate(s).

(5) A solar power generation system having plural solar cell strings in each of which plural solar cell modules are connected to each other in series, wherein the system comprises: a measuring device for making a measurement of the current value of each of the solar cell modules and/or the current value of each of the solar cell strings and the total current value of the whole of the solar power generation system; a means for comparing the measured current value of each of the solar cell modules and/or the measured current value of each of the solar cell strings with an average current value per one solar cell module and/or an average current value per one solar cell string that are calculated out from the measured total current value of the whole of the solar power generation system, and then extracting, when the measured current value(s) of one or more of the solar cell modules and/or the measured current value(s) of one or more of the solar cell strings is/are (each) lower than the calculated average current value per one solar cell module and/or the calculated average current value per one solar cell string by a predetermined percentage or more, the solar cell module(s) and/or the solar cell string(s) in the low current value state as failure candidate(s); and a displaying or notifying means for displaying or notifying the failure candidate(s).

(6) The solar power generation system according to item (5), wherein the system gives a power generation quantity of 1 megawatt or more.

Effect of the Invention

In the failure detecting method for the solar power generation system of the present invention, the following is merely carried out: at the time when the measured current value(s) of one or more of the solar cell modules or strings is/are (each) lower than the average current value per one solar cell module or string that is calculated out from the total current value of the whole of the system by a predetermined percentage or more, the solar cell module(s) or string(s) in the low current value state is/are extracted as failure candidate(s). Accordingly, failure-detection can be attained in a very simple way. Additionally, the current values to be compared with each other are based on the solar cell modules or strings that are in substantially the same environment at the same time, which are substantially equally affected by external factors, such as weather; therefore, without referring to data in the past or conducting any complicated processing, the failure candidate(s) can be extracted with a high precision while influences caused from the external factors are excluded. The failure detecting method for a solar power generation system of the present invention attains, in particular, a large decrease in costs for detecting a failure of a mega solar system wherein a large number of solar cell modules or strings are present in a very wide site to give a power generation quantity of 1 megawatt or more.

BRIEF DESCRIPTIONS OF DRAWINGS

BEST MODE FOR CARRYING OUT THE INVENTION

A failure detecting method for a solar power generation system of the present invention will now be illustrated below with reference to Figures although the present invention is not limited thereto.

Figure 1:
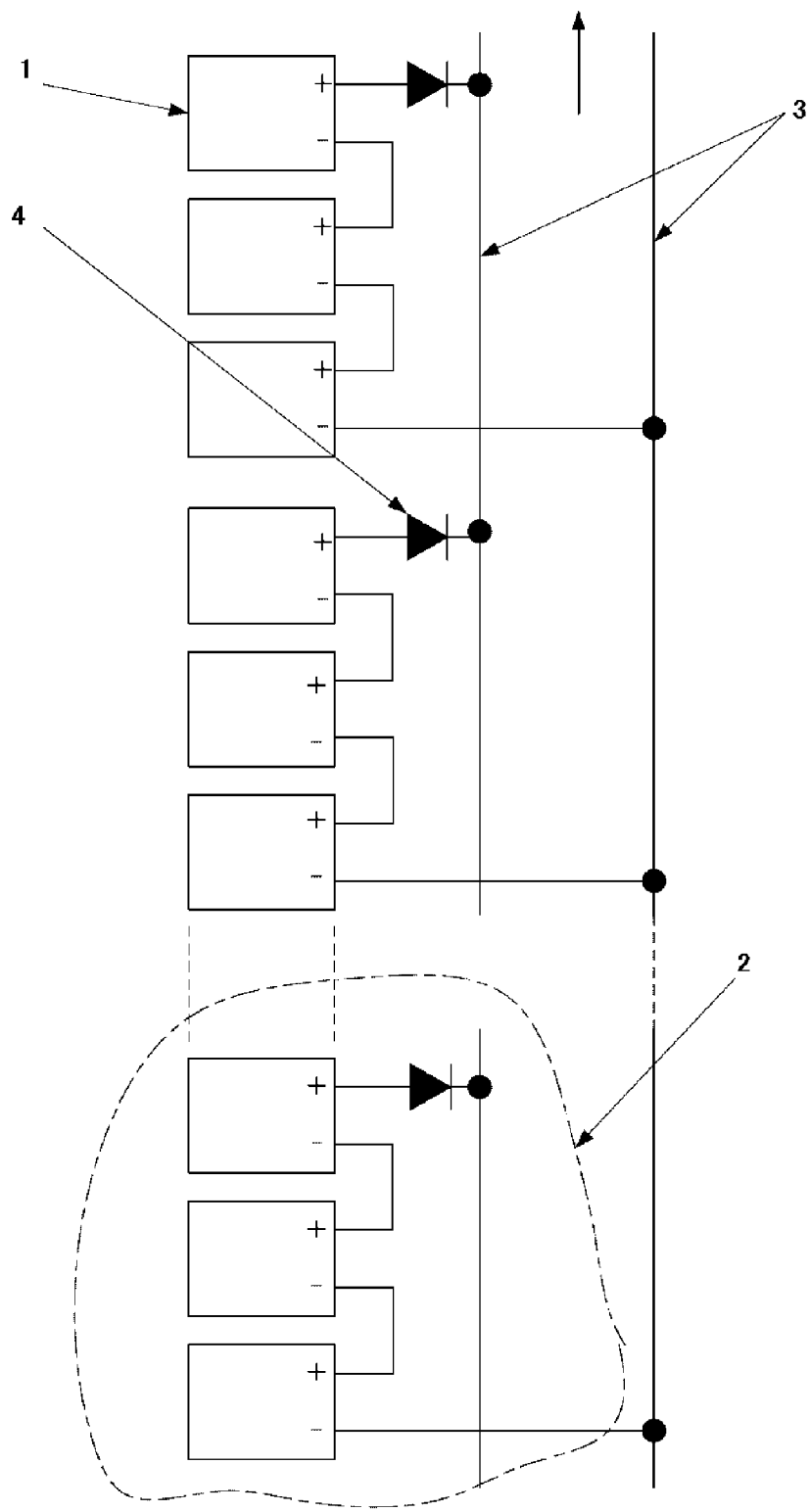
FIG. 1 is an illustrative drawing of an example of a solar power generation system.

The solar power generation system to which the method of the present invention is applied is a system as illustrated in FIG. 1, which has plural same solar cell strings 2 in each of which plural same solar cell modules 1 are connected to each other in series. The method of the present invention attains the detection of the failure of one or more of the solar cell modules 1 or the solar cell strings 2 with a high precision.

The method of the present invention is usable in systems from small-scale systems each set up on the roof of a home housing to large-scale systems each giving a power generation quantity of 1 megawatt or more. The method produces a greatly large effect onto mega solar systems in each of which a very large number of solar cell modules or strings are set and very much labor is required for works for checking the modules or strings.

Figure 2:
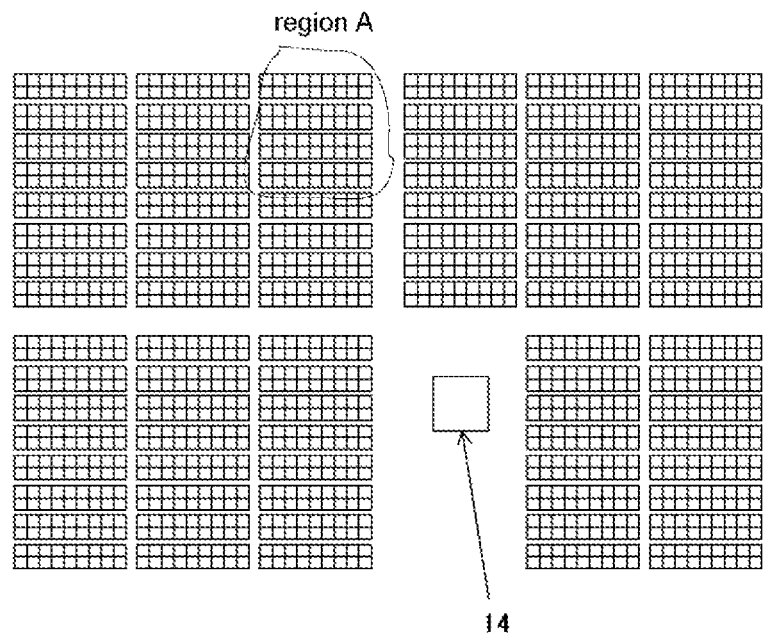
FIG. 2 is an illustrative drawing of an example of a mega solar system.
Figure 2:
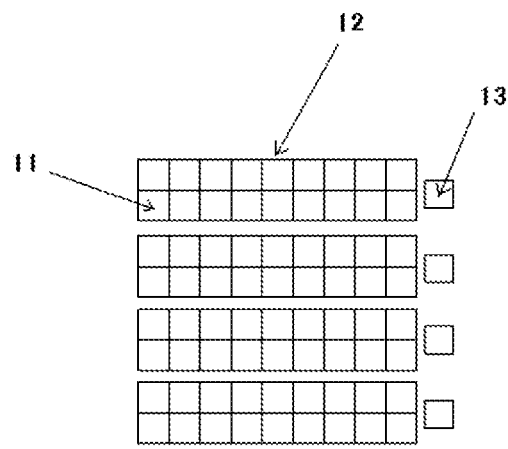

As illustrated in FIG. 2, in a mega solar system, a large number of solar cell modules 11 on which solar cell panels giving the same power generation quantity are mounted, respectively, are arranged. As understood from a partial enlarged view of a region A, which is a partial region of the system, individual electric powers generated by the solar cell modules 11 are sent to connection boxes 13, respectively, through respective strings 12, each of which is composed of, for example, 18 modules out of the modules 11. Furthermore, the electric powers in all the connection boxes 13 are collected to a collection box 14, sent to a power conditioner (not illustrated), and then sent to the outside. The solar power generation system to which the method of the present invention is applied is not particularly limited as far as the number of modules per one string is plural, and as far as the number of strings in the system is plural. In the method of the present invention, it is preferred that the number of modules per string is from 3 to 100, and that the number of strings in the system is from 100 to 10000. It is however necessary that the type of individual solar cell modules used in the system, as well as the number of the modules per string, are made equivalent to each other in order to compare the electric current values precisely.

As the causes for a lowering in the power generation quantity (current value) of any one of the solar cell modules or strings, there exist temporary causes, which may be ignored, and lasting causes, which are required to be repaired or exchanged. The temporary causes include hours of daylight, the existence of clouds, rainy weather, and other weather factors; a shadow of a building; a periodic maintenance thereof; and others. The lasting causes include a failure of the solar cell module, breaking of wire, a breakage of a diode for backflow prevention, a failure of a measuring device or communication means therefor, droppings of birds, and others. In the method of the present invention, the solar cell module or string wherein the power generation quantity is lowered by a temporary cause, which may be ignored, is excluded, and made is a detection of only the solar cell module or string that is truly required to be repaired or exchanged, wherein the power generation quantity is lowered by a lasting cause.

When causes for a temporary lowering in the power generation quantity are each considered, the causes hardly include a cause which affects only one of the modules or strings. For example, weather factors, such as hours of daylight, the existence of clouds, rainy weather, affect all the modules or strings in the system substantially equivalently. Accordingly, when the power generation quantity (current value) of specified one of the solar cell modules or strings is made lower than an ordinary value by a temporary cause as described above, the power generation quantity of each of the other modules or strings should also be made lower to the same degree. Based on this finding, in the present invention, the measured current value of each of the solar cell modules or strings is compared with the average current value per one solar cell module or string that is calculated out from the total current value of the whole of the system that is measured in substantially the same environment at the same time; and when one or more of the measured current values are (each) lower than the average current value by a predetermined percentage or more, the module(s) or string(s) in the low current value state is/are extracted as failure candidate(s). According to this comparing method, only one or more module(s) or string(s) in a failure state, out of the modules or strings, can be precisely detected without being affected by any temporary external factor.

The current value measurement is made in each of the solar cell modules or in each of the solar cell strings, depending on a unit wherein a failure is to be detected. When the scale of the solar power generation system is small, it is preferred to make the measurement in each of its modules. When the scale is large or the number of measuring devices is required to be made small from the viewpoint of costs, it is preferred to make the measurement in each of its strings. The manner of the comparison between the current values is varied in accordance with the unit to be measured. A comparison is made between the measured current value of any one of the modules and the average current value per one module or the measured current value of any one of the strings and the average current value per one string. The average current value per one module or the average current value per one string is calculated by dividing the measured total current value of the whole of the solar power generation system by the number of the modules or the number of strings.

According to the method of the present invention, when the result of the above-mentioned comparison demonstrates that the measured current value(s) of one or more of the solar cell modules or the measured current value(s) of one or more of the solar cell strings is/are (each) lower than the average current value per one solar cell module or the average current value per one solar cell string, which are calculated as described above, by a predetermined percentage or more, the solar cell module(s) or the solar cell string(s) in the low current value state is/are extracted as failure candidate(s). The percentage of the lowering of each of the current values, for the extraction, is preferably 30% or more, more preferably 40% or more, in order that the system may not pick up noises at the time of the extraction. When the total current value of the whole of the system is as low as 20% or less of an expected maximum current value, the precision may be poor even when the comparison is made. Thus, the extraction of the failure candidate(s) may be temporarily stopped. Alternatively, when the extraction is performed, it is preferred to make the percentage condition of the lowering of each of the current values for the extraction as high as 50% or more.

The measurement and the comparison of the current values of the solar cell modules or strings may be continuously made, or may be intermittently made at intervals of, for example, several seconds, several minutes, several ten minutes and several hours. When the total current value of the whole of the system is zero or a very low value, the failure candidate(s) is/are not easily extracted; therefore, it is preferred to stop the measurement or the comparison temporarily. The extraction of the solar cell module(s) or string(s) as the failure candidate(s) may be performed based on the comparison result only at a certain time. In order to make an improvement in precision, however, it is preferred to extract, as the failure candidate(s) out of the modules or strings, only one or more modules or strings wherein the current value has been lowered by the predetermined percentage or more continuously over a predetermined period or more. The continuance necessary for the extraction in this case, during which the state that the current value(s) of the module(s) or string(s) is/are lowered is continued, is preferably 10 minutes or more, 30 minutes or more, 1 hour or more, 3 hours or more, 4 hours or more, 8 hours or more, 1 day or more, 3 days or more, and 7 days or more. Even when the failure candidate(s) is/are extracted, a work for checking the solar cell module(s) or string(s) cannot be immediately initiated. Thus, this period (continuance) may be matched with each of intervals between the checks made by a checking worker. After the failure candidate(s) is/are extracted, the failure candidate(s) is/are displayed or notified for notifying it to a manager or the checking worker.

Figure 3:
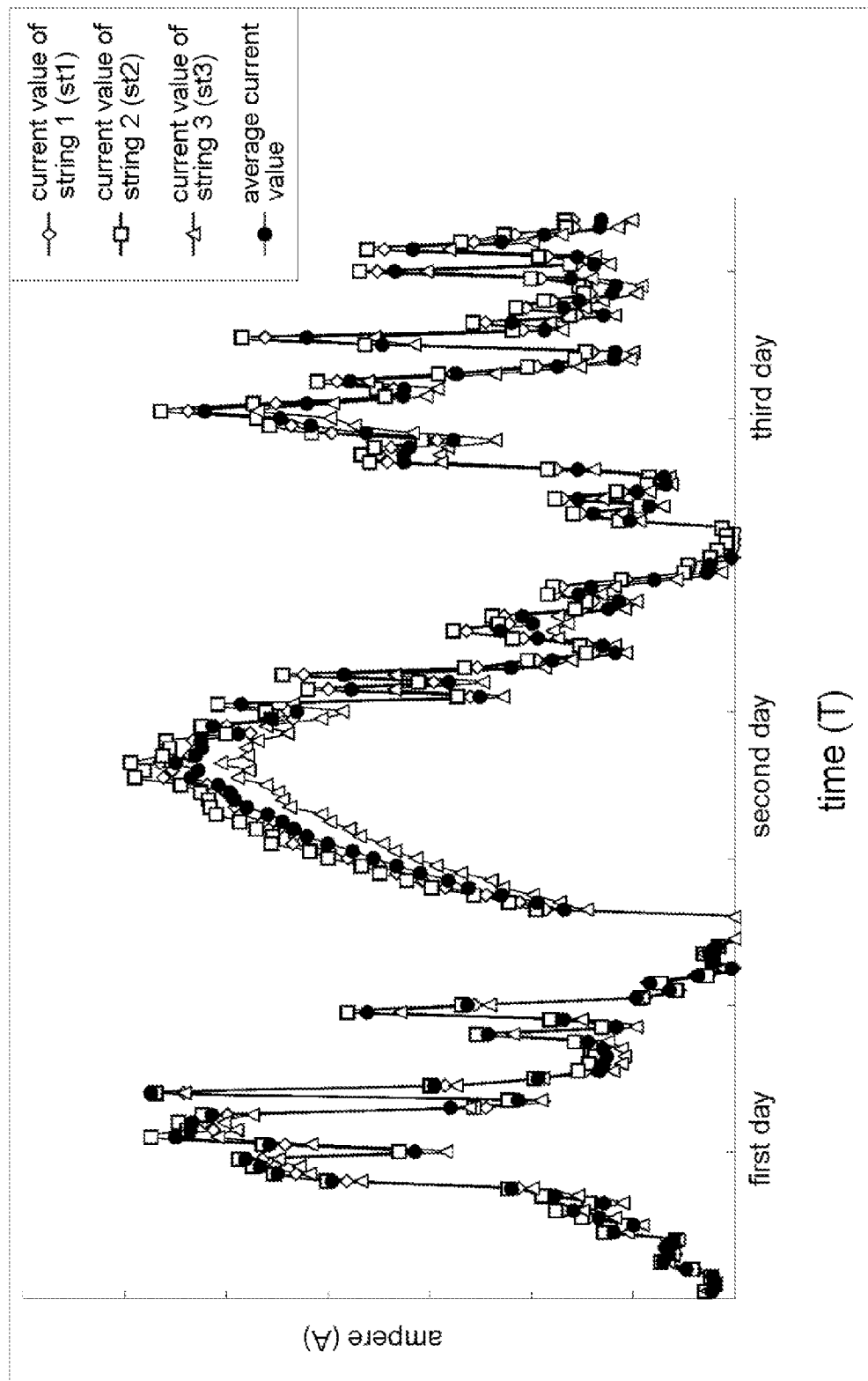
FIG. 3 is a graph wherein the following are plotted with time: the average current value per one solar cell string that is calculated out from the total current quantity of the whole of a mega solar system in FIG. 2; and the current values of the specified solar cell strings.

FIG. 3 is a graph showing movements of the current values of specified three solar cell strings (st1, st2, st3) in a mega solar system as illustrated in FIG. 2, and a movement of the average current value per one string that is calculated from the total current value of the whole of the system over a period of three days (only sunshine durations). When the measured current value of each of the three solar cell strings is compared with the average current value over the three days with reference to FIG. 3, the percentage of a lowering of each of the measured current values from the average current value is substantially zero, and is less than 30%. This demonstrates that even when there is generated a period when the measured current value of each of the three solar cell strings (st1, st2, st3) is temporarily lowered, such a lowering is due to a temporary external factor, and it does not correspond to a failure. Based on this idea, in the method of the present invention, about all of the solar cell modules or strings, the current values are measured, respectively, and each of the measured current values is compared with the average current value. As a result, out of all the modules or strings, one or more modules or strings wherein the measured current value is lower than the average current value by a predetermined percentage or more, or wherein the low current value state is continued is/are extracted as failure candidate(s). The method of the present invention is characterized in that the method is very simple while noises against the extraction of the failure candidate(s) are small.

The following will describe a solar power generation system for realizing the method of the present invention. As described above, the solar power generation system has plural same solar cell strings in each of which plural same solar cell modules are connected to each other in series. The system is preferably a system giving a power generation quantity of 1 megawatt or more. The solar power generation system of the present invention needs to have a measuring device for measuring the current value of each of the solar cell modules and/or the current value of each of the solar cell strings and for measuring the total current value of the whole of the solar power generation system. The current value measuring device may be any means known in the conventional art, and, for example, the following method may be adopted therefor: a method of measuring the current in the way of inserting a resistor for measurement, in series, into a measuring point, and then converting to the voltage at both ends of the resistor. The measuring device is appropriately mounted to each of the modules or strings or to the power collection box. It is allowable to adopt, as the total current value of the whole of the system, a value obtained by summing up the respective measured current values of all the modules or strings.

The solar power generation system of the present invention also needs to have a means for comparing each of the measured current values with the average current value, and extracting one or more solar cell modules and/or strings as one or more failure candidates based on the result of the comparison. This means needs to have a function of: gaining data on the current values measured by the measuring device through wired or wireless communication means; comparing the measured current value of each of the solar cell modules and/or the measured current value of each of the solar cell strings with the average current value per one solar cell module and/or the average current value per one solar cell string that are calculated out from the measured total current value of the whole of the solar power generation system; and then extracting, when one or more of the measured current values is/are (each) lower than the average current value by a predetermined percentage or more, the solar cell module(s) and/or the solar cell string(s) in the low current value state as failure candidate(s). As this means, any calculating means known in the conventional art may be used. In this case, the calculating means may be programmed comparing conditions and extracting conditions as described above beforehand and then operated.

The solar power generation system of the present invention also needs to have a displaying or notifying means for displaying or notifying the failure candidate(s) in order to notify a manager of the extracted solar cell module(s) and/or the solar cell string(s) which is/are the failure candidate(s). The displaying means may be, for example, a liquid crystal or an LED display device for displaying the failure candidate(s) with a character, a symbol or a graph. The notifying means may be, for example, an acoustic device, such as a speaker for announcing the failure candidate(s) with voice. In the solar power generation system of the present invention, any abnormality detecting means known in the conventional art which utilizes comparison with past data may be further combined with the above-mentioned devices and means. Additionally, a parameter other than the current value may be added as a measured parameter.

INDUSTRIAL APPLICABILITY

According to the present invention, in particular, in a solar power generation system giving a power generation quantity of 1 megawatt or more, the failure of one or more of its solar cell modules or strings can be precisely extracted in a simple way. Therefore, the present invention can cope with one or more failure spots in the system promptly. Moreover, the apparatus and the method of the present invention can easily be added and introduced to any existing solar power generation system.

EXPLANATION OF REFERENCE NUMBERS

1: solar cell module
2: solar cell string
3: electric power cable
4: diode for backflow prevention
11: solar cell module
12: solar cell string
13: connection box
14: collection box

The invention claimed is:

1. A failure detecting method for a solar power generation system having plural solar cell strings in each of which plural solar cell modules are connected to each other in series, wherein: made is a measurement of the current value of each of the solar cell modules or the current value of each of the solar cell strings and the total current value of the whole of the solar power generation system; the measured current value of each of the solar cell modules or the measured current value of each of the solar cell strings is compared with an average current value per one solar cell module or an average current value per one solar cell string that are calculated out from the measured total current value of the whole of the solar power generation system; when the measured current value(s) of one or more of the solar cell modules or the measured current value(s) of one or more of the solar cell strings is/are (each) lower than the calculated average current value per one solar cell module or the calculated average current value per one solar cell string by a predetermined percentage or more, the solar cell module(s) or the solar cell string(s) in the low current value state is/are extracted as failure candidate(s); and then the extracted module(s) or string(s) is/are displayed or notified.

2. The failure detecting method for the solar power generation system according to claim 1, wherein the measurement and the comparison of the current values are continuously or intermittently made.

3. The failure detecting method for the solar power generation system according to claim 1, wherein out of the solar cell modules or the solar cell strings, one or more solar cell module(s) or solar cell string(s) wherein the low current value state is detected even after a predetermined period elapses are extracted as the failure candidate(s).

4. The failure detecting method for the solar power generation system according to claim 1, wherein the solar cell module(s) or the solar cell string(s) having the percentage of the lowering in the current value of 30% or more is/are extracted as the failure candidate(s).

5. A solar power generation system having plural solar cell strings in each of which plural solar cell modules are connected to each other in series, wherein the system comprises: a measuring device for making a measurement of the current value of each of the solar cell modules and/or the current value of each of the solar cell strings and the total current value of the whole of the solar power generation system; a means for comparing the measured current value of each of the solar cell modules and/or the measured current value of each of the solar cell strings with an average current value per one solar cell module and/or an average current value per one solar cell string that are calculated out from the measured total current value of the whole of the solar power generation system, and then extracting, when the measured current value(s) of one or more of the solar cell modules and/or the measured current value(s) of one or more of the solar cell strings is/are (each) lower than the calculated average current value per one solar cell module and/or the calculated average current value per one solar cell string by a predetermined percentage or more, the solar cell module(s) and/or the solar cell string(s) in the low current value state as failure candidate(s); and a displaying or notifying means for displaying or notifying the failure candidate(s).

6. The solar power generation system according to claim 5, wherein the system gives a power generation quantity of 1 megawatt or more.

* * * * *